Oct. 3, 1933.　　　　　R. B. DE LONG　　　　　1,928,883

METAL STRIPE

Filed Jan. 19, 1931

INVENTOR,
Robert B. De Long,
BY
Howard D. Smith,
his ATTORNEY

Patented Oct. 3, 1933

1,928,883

UNITED STATES PATENT OFFICE 1,928,883

METAL STRIPE

Robert B. De Long, Cleveland, Ohio

Application January 19, 1931. Serial No. 509,779

1 Claim. (Cl. 41—34)

This invention relates to a metal stripe.

It is the principal object of my invention to apply to a metal surface, such as that of an automobile body, a metal stripe which will not rub off, leaving no stripe at all or a stripe with a ragged edge to detract from its appearance.

At present all stripes which are painted on an automobile body must be placed thereon after all other work such as painting, polishing and retouching the metal surface of it is completed.

Furthermore, after the painted stripe is applied to an automobile body, it will eventually rub off under a normal amount of work in keeping it polished.

My metal stripe when applied to a metal surface such as that of an automobile body, will eliminate the disadvantages of a painted stripe in the above and other respects. Not only will this stripe outlast the life of the automobile body to which it is applied, but its sharp, straight edges and very high lustre will make it appear attractive at all times.

Furthermore, my metal stripe is applied to the automobile body before it is painted by brazing, welding or soldering it thereon, or by pressing it into the panel with dies. It can also be used on any ornamental work irrespective of construction.

Figure 1:
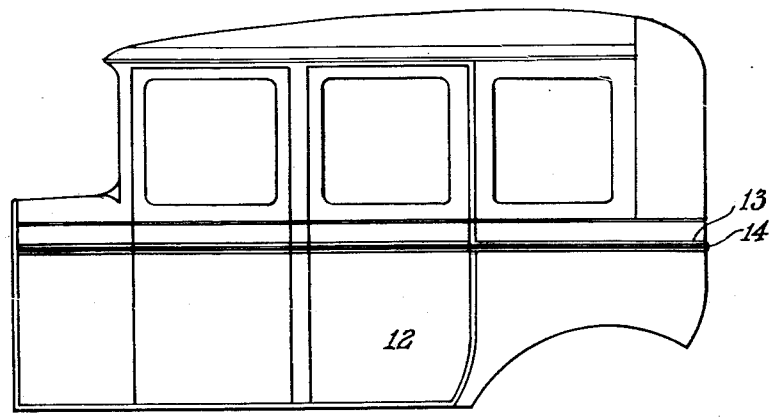
Figure 2:
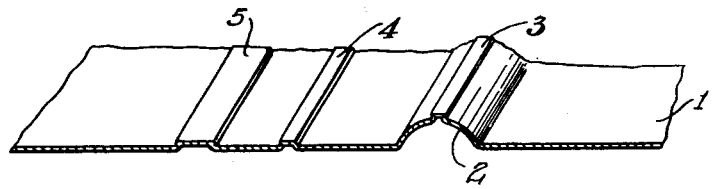

In the acompanying drawing illustrating my invention, Figure 1 is a side elevational view of an automobile body to which my metal stripe has been applied. Figure 2 is a perspective view of a portion of a metal panel in which metal stripes have been impressed by a panel forming die. And Figure 3 is a perspective view of a portion of a metal panel to which my metal stripes have been brazed, soldered or welded, one on a bead and the remaining ones on the flat metal surface in a variety of combinations.

Figure 3:
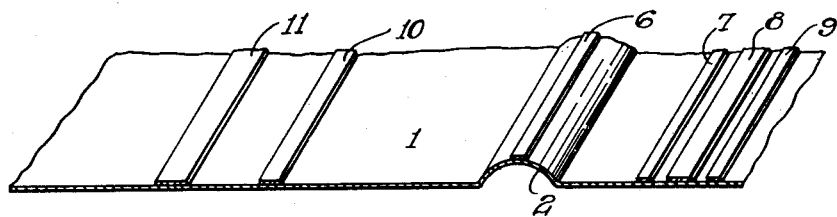

Referring to the accompanying drawing for a detailed description of the various forms of embodiment of my invention, the numeral 1 in Figures 2 and 3 designates a longitudinal strip of metal formed with a bead 2. Integral with this bead in Figure 2 is an extruded metal stripe 3 that I have produced upon it with a strip or panel forming die, which has been constructed for this purpose. Two other metal stripes 4 and 5, of different widths, have been impressed upon the metal strip 1, but at one side of the bead 2. Thus, any number of metal stripes of the desired length, width and depth may be formed upon a metal body by suitable dies.

In Figure 3 I have placed a stripe 6 of brass or other suitable metal upon the bead 2 by brazing, soldering or welding it thereto. At the right of the bead 2 three other metal stripes 7, 8 and 9 have been similarly applied to the strip 1, while on the opposite side of the bead two metal stripes 10 and 11 have been secured to the strip.

It is thus seen that my metal stripe in different lengths, depths and widths, may be applied in a variety of combinations to the surface of metal bodies, and more particularly to a vehicle body such as the automobile body 12 in Figure 1. Here a metal stripe 13 is applied to a bead 14 on the body to provide a stripe which will never rub off or become ragged, and one which will add lustre and refinement to its appearance. Such a stripe will outlast the body panel to which it is applied and will adorn it irrespective of any irregularities in its construction.

Having described my invention, I claim:

The combination with a metal body formed with a bead, of an ornamental metal stripe applied to the middle external surface of said bead.

ROBERT B. DE LONG.